United States Patent [19]
>
> Thune

[11] 4,306,851
[45] Dec. 22, 1981

[54] CAM ACTING CORE LOCK AND STRAIGHTENER

[75] Inventor: Robert H. Thune, Anderson, Ind.

[73] Assignee: General Motors Corporation, Detroit, Mich.

[21] Appl. No.: 210,525

[22] Filed: Nov. 26, 1980

[51] Int. Cl.³ .................... B29C 1/06; B29F 1/002
[52] U.S. Cl. ..................... 425/468; 425/DIG. 5; 425/577
[58] Field of Search ............ 425/577, 468, DIG. 5

[56] References Cited
U.S. PATENT DOCUMENTS

| | | | |
|---|---|---|---|
| 3,473,197 | 10/1969 | Wilds et al. | 425/577 |
| 3,509,603 | 5/1970 | Halsall et al. | 425/577 |
| 3,564,660 | 2/1971 | Darnell | 425/468 X |
| 3,816,047 | 6/1974 | Mohler | 425/577 |
| 3,969,055 | 7/1976 | Buckethal | 425/468 X |
| 3,972,737 | 8/1976 | Sullivan et al. | 425/468 X |
| 4,128,361 | 12/1978 | Bonis | 425/DIG. 5 |

Primary Examiner—J. Howard Flint, Jr.
Attorney, Agent, or Firm—Elizabeth F. Harasek

[57] ABSTRACT

A means and method are provided for straightening and locking an elongated cantilevered mold core into molding alignment before injecting a molding composition into a cavity for a deep, thin-walled container. In a preferred embodiment a core locking cam means is rotatably retained in the base of a mold. A stationary complementary cam reacting means is located in the free end of the core. The core is locked by telescoping the cam means into the reacting means and rotating the cam means to bring it into locking engagement with the core end.

10 Claims, 16 Drawing Figures

CAM ACTING CORE LOCK AND STRAIGHTENER

BACKGROUND

This invention relates to a means for straightening and locking a cantilevered mold core into desired molding alignment before injecting a molding composition into a cavity for a deep, thin-walled container. The invention is particularly adapted for injection molding rigid, thin-walled, partitioned containers such as multicell battery cases for automotive applications.

Relatively deep, thin-walled containers may be injection molded by inserting one or more elongated, cantilevered cores into a female mold and injecting a hardenable polymeric material into the mold cavity formed between them. A partitioned container may be formed by inserting a plurality of cores into a female mold, the spaces between cores defining the partition walls. Generally, polypropylene cases for multi-celled automotive storage battery cases are made in this manner.

Unless elongated mold cores are restrained at their free ends during the initial high pressure injection of the molding material, they tend to become misaligned with respect to one another. Any deflection of the cores out of desired alignment causes variations in partition and outer wall thicknesses. If the cores are greatly misaligned, the partitioned walls will be uneven and improperly spaced. Even slight variations in container wall thicknesses make ejection of a finished part difficult and tend to increase mold residence time. Thus it has been desired to provide a means and method for locking mold cores into position for the high pressure injection of molding material. Means have also been sought for straightening cores which have been bent out of alignment.

In the molding of multicelled automotive battery cases, one method of restraining mold cores has been the insertion of retractable pins into complementary recesses in the free ends of the cores prior to material injection. The pins are retracted near the end of the material injection portion of the molding cycle. The pin retraction causes the pin recesses in the cores to fill with the molding composition. This creates undesirable peg-like projections into the bottoms of the molded container. Moreover, this locking system will not tolerate bent cores. Any misalignment between the cores and the pins before mold closure may cause the pins to break or bend leading to expensive mold repair and machine down time.

Another method has been the insertion of pie shaped wedges between the free ends of adjacent cores prior to material injection. The wedges are retracted near the end of the material injection portion of the molding cycle to fill out the bottom of the battery case. This method produces sloping surfaces between partition walls and the bottom of the battery case. These slanted portions may interfere with the later insertion of battery plates into cell compartments. This method also requires the use of special holders for the end cores adjacent the battery case end walls so that they will not be bent out of alignment. This severely complicates the mold adding to initial expense and mold maintenance.

It is therefore an object of this invention to provide an improved apparatus for injection molding deep, thin-walled containers wherein elongated cantilevered core members are straightened and locked into position prior to injecting a molding material. Another object is to provide means for straightening and locking cantilevered cores for injection molding wherein a core locking cam means is rotatably retained in the mold base and complementary cam reacting means are located in the free ends of the cores. Means are further provided to rotate the core locking cam means with respect to the cores to force them into desired alignment and lock them into such alignment before injecting a hardenable molding material. A more specific object is to provide at least one cam-type locking member for each cantilevered core member and means to telescope the cam locking member into and out of the free end of a mold core. Another object is to provide means to rotate the locking members with respect to the cores to provide a cam-type straightening and locking thereof preparatory to molding.

A more specific object of the invention is to provide an improved molding apparatus for injection molding thin-walled containers which are divided into compartments by integral thin partitioning walls. It is an object to provide such apparatus with means for simultaneously locking a plurality of core members into parallel alignment prior to molding so that the wall defining portions of the mold cavity formed between the cores are of uniform thickness.

Another object of the invention is to provide apparatus for making deep, thin-walled containers where specially adapted cam-type locking members are provided in the base of the mold. It is a further object to provide means to sequentially insert these members into cooperative receiving members at the free ends of the cantilevered mold cores; to rotate the locking members within the receiving members to bring the cores into desired molding alignment and lock them prior to injecting molding material; to rotate the locking members out of locking engagement after material is injected into the mold; and to withdraw them from the core members to provide for fill-out of the container wall between the base and core ends. A more specific object of the invention is to provide locking means in the base of the mold in the form of noncircular or ellipsoidal protruding cams and complementary shaped receiving portions in the free ends of the core which are lockingly engageable by the cams.

Another object of the invention is to provide an improved apparatus for molding deep, thin-walled containers by locking elongated mold core members into position prior to injecting a hardenable molding material. A more particular object of the apparatus is to telescope a cam-type core locking member (retained in the bottom of the mold) into a corresponding receiving member (located in the free end of the core) and to rotate the locking member relative to the receiving member so that the end of the core is cammed and straightened into the desired alignment and locked prior to injecting the molding material.

BRIEF SUMMARY

In accordance with a preferred practice of the invention, these and other objects are accomplished as follows.

An injection mold for a deep, thin-walled container is provided. The molding cavity is defined by the sides of the mold and at least one elongated cantilevered core inserted therein. The mold base defines the bottom of the container and has at least one cam-type locking member for each core slidably and rotatably retained in it. The cam acting means itself is preferably an ellipsoidal shaped frustoconical cam which projects from the mold base into the molding cavity. The free end of each core, in turn, is provided with a complementary cam reacting means which is preferably an ellipsoidal shaped recess with tapered walls sized to accommodate the corresponding cam acting means.

To lock the core or cores prior to molding, the cam acting means are telescoped into the complementary cam reacting means. The cams are then rotated with respect to the recesses to positively engage the core or cores and force them into the desired molding alignment. A hardenable molding material is then injected into the molding cavity. After the fluid pressure of the injected material stabilizes the core positions, the cams are rotated out of the locked position. If desired, the cams may be withdrawn from the telescoped position to allow for mold fill-out between the base and free end(s) of the core(s). The hardened part is ejected in accordance with ordinary molding practices.

DETAILED DESCRIPTION

These and other objects and advantages of my invention will be apparent from the following detailed description and drawings in which.

Like features of the several figures are indicated by like numbers.

Figure 1:
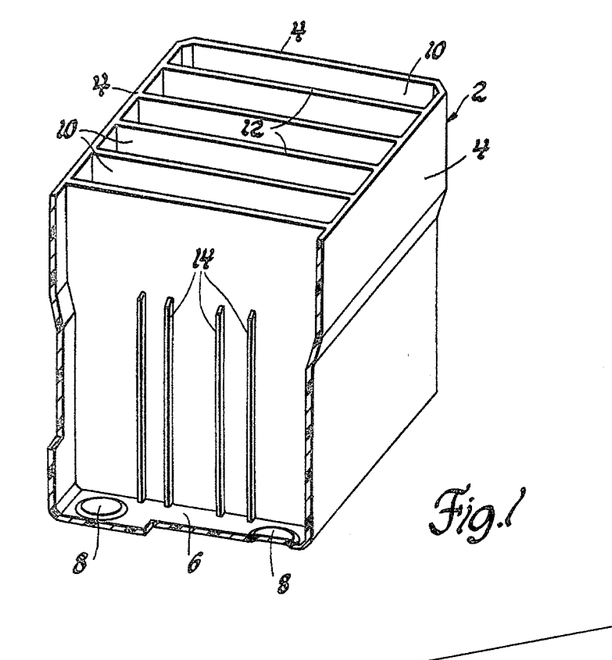
FIG. 1 is a perspective view, partly broken away, of a battery case molded in accordance with the invention.
Figure 2:
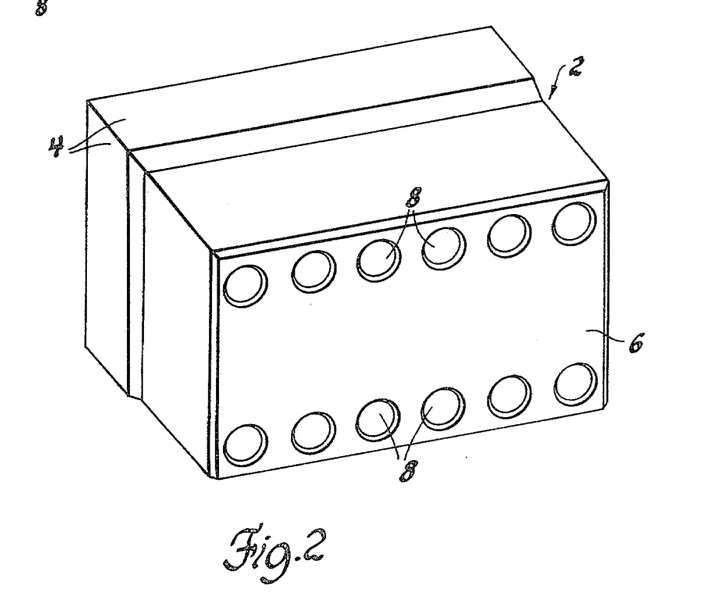
FIG. 2 shows a perspective view of a molded battery case showing the core locking witness marks in the bottom.

Referring to FIGS. 1 and 2, a rigid, molded, polymeric case 2 for a six cell lead-acid storage battery is shown. Battery case 2 has contoured side walls 4 and a substantially flat bottom 6 with witness marks 8 left by a core locking apparatus of the type described herein. As best seen at FIG. 1, the witness marks 8 are relatively shallow and are located at either end of each cell compartment 10 on bottom 6 of battery case 2. They are flat enough so as not to interfere with the insertion of the battery plates in the cells. Individual battery cell compartments 10 are separated by thin, transverse partitions 12 with integrally molded reinforcing ribs 14. Additional ribs, bosses, and other features may be incorporated in a molding as desired. In accordance with my invention, the mold cores which define cells 10 are locked into parallel positions with great accuracy so that partition walls 12 have uniform thicknesses and are parallel to one another.

While a case for a conventional six cell automotive lead-acid storage battery has been illustrated at FIGS. 1 and 2, other thin-walled, deep containers may be made as set forth herein. For example, narrow, deep, single cell nickel-zinc battery cases may be accurately formed and easily dismolded if the subject core locking device and method are used. Similarly, partitioned articles such as soft drink bottle carriers or deep compartmentalized trays could be beneficially formed in accordance with this invention. The articles may be made of any injection moldable polymeric material suitable for a particular application, however, polypropylene is generally preferred for battery case applications. The material may be a thermosetting or thermoplastic polymer or other hardenable material. The greatest advantage is derived by the subject invention where the molded container is rigid or semi-rigid although the invention could be adapted for molding containers from rubbery, flexible compositions.

The beneficial effects provided by my core locking device become more dramatic as the depth of the article and the thinness of its walls are increased. Use of the invention allows the rapid molding and mold ejection of a battery case which has, for example, a wall thickness of about 0.1 inch and a depth of about 6 inches or more.

Figure 3:
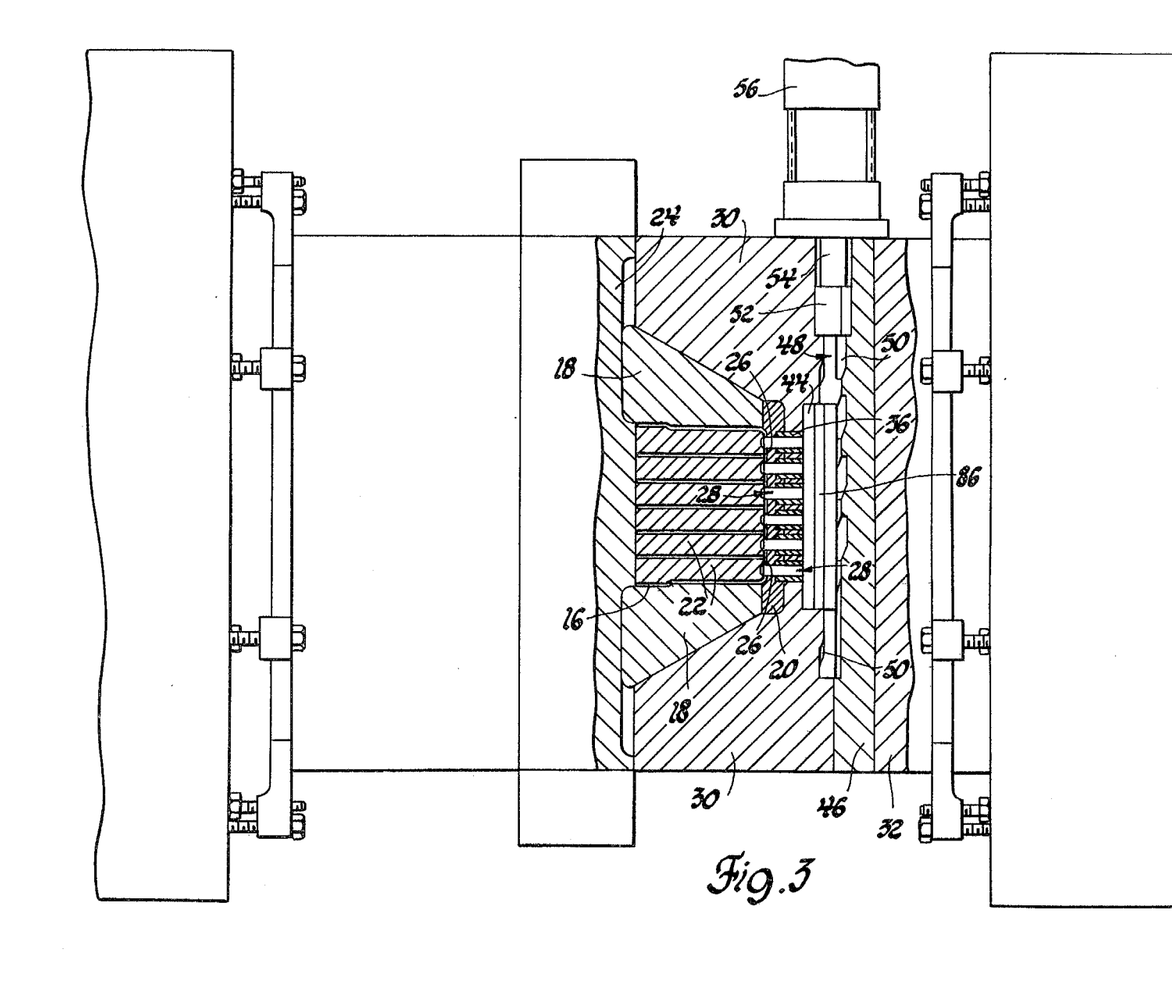
FIG. 3 is a simplified cross-sectional view of a preferred core locking device for a horizontally actuated battery case mold.

The battery case shown in FIGS. 1 and 2 may be made in a conventional injection molding press wherein the tools are modified to accommodate the subject core locking apparatus. FIG. 3 shows a portion of a horizontally actuated injection molding machine partially sectioned to reveal the core locking mechanism to be described hereafter. The machine is depicted in the mold closed position. A molding cavity 16 for a six cell battery case is formed between the mold side walls 18, mold base 20, and cores 22 which are cantilever-supported from the stripper plate 24. The distal ends 26 of the cantilevered cores 22 are shown locked in place by cam members 28. The cam members 28 and their associated actuating mechanism are located in the dies 30 mounted on the stationary mold 32.

Figures 5, 6, 7, 8, 9:
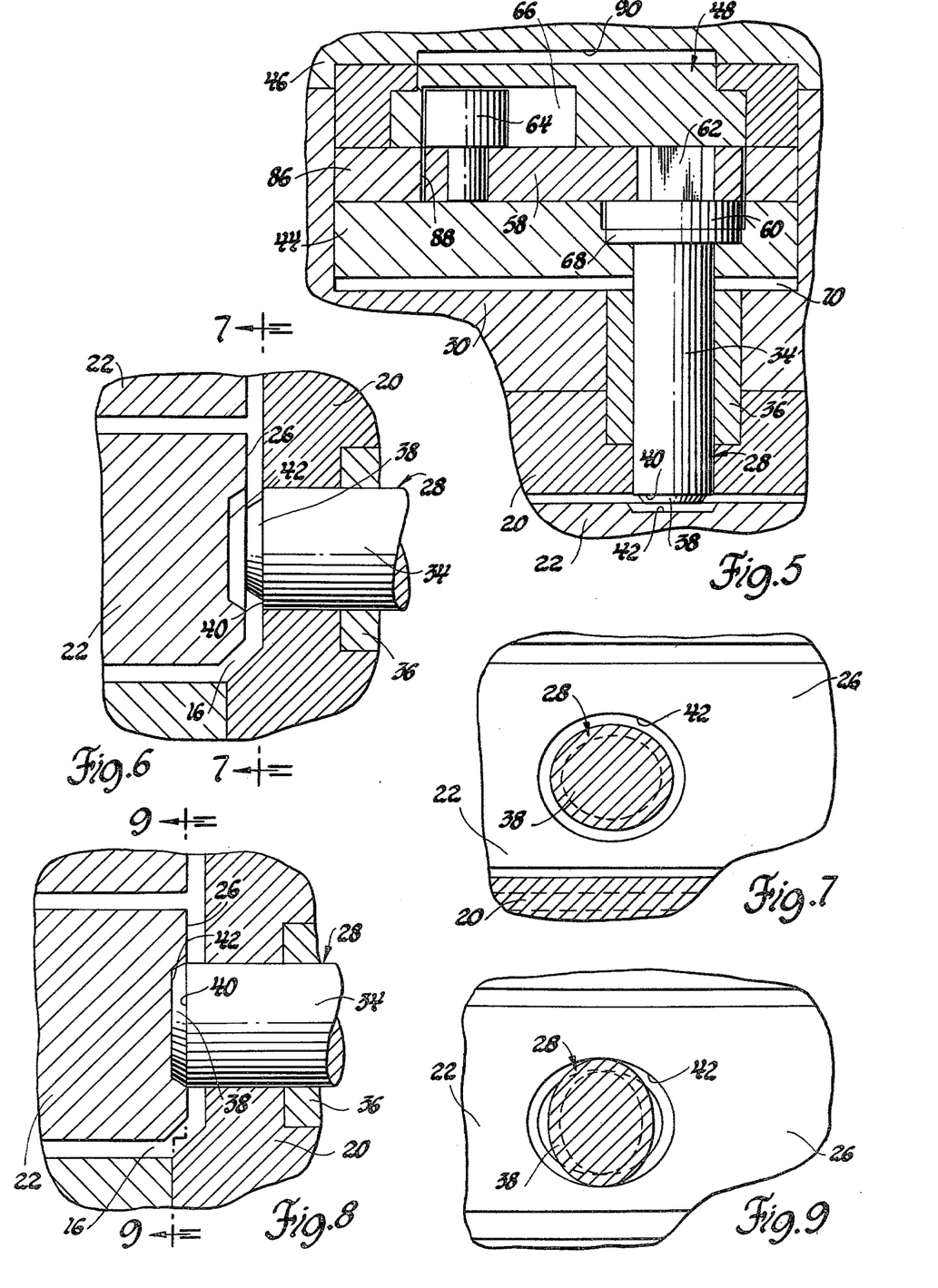
FIG. 5 shows a sectional view of a preferred core locking cam member and its actuating mechanism taken along 5—5 of FIG. 4.
FIGS. 6 and 8 show sectional views of a locking cam relative to a complementary core recess in unlocked and locked positions, respectively.
FIGS. 7 and 9 are sectional views of the cams and recesses of FIGS. 6 and 8 taken along 7—7 and 9—9, respectively.

Referring now to FIGS. 6 through 9, the locking action of the cam members 28 with respect to the mold cores 22 will be described. The cam locking member 28 consists of a cylindrical shaft 34 that is slidably and rotatably retained in the mold base 20 which defines the bottom of the battery case 6 and a bushing 36. A frustoconical cam 38 projects outwardly from the head 40 of shaft 34 into the molding cavity 16. A recess 42, tapered to complement the taper of the cam 38, is provided in the free end 26 of the cantilevered core 22. FIGS. 6 and 7 show the cam locking member 28 in the unlocked position where it is retracted with respect to the base 20. The head 40 of the cylindrical shaft 34 which carries the cam lies flush with the surface of the mold base 20. The space between the core 22 and the base 20 containing the locking cam 28 defines a portion of the molding cavity for the bottom wall of the battery case.

In the preferred embodiment shown, both the cam 38 and recess 42 are ellipse-shaped frustums. The length of the major ellipsoidal axis of the cam 38 is equal to the length of the minor axis of the complementary recess 42. When the major axes of the cam and recess are parallel and aligned, as shown at FIG. 7, there is no locking engagement therebetween.

Referring now to FIG. 8, the cam member is shown in the locked position. The cam member is in the fully extended position with respect to the base 20 so that the cam head 38 is telescoped into the recess. As best seen at FIG. 9, the cam 28 has been rotated 90° from the parallel cam position of FIG. 7 so that the major ellipsoidal axis of the cam head 38 is now aligned with and parallel to the minor axis of the core recess 42. In the locked position, the free end of the core 22 is engaged by the cam head 38 to bring it in to the desired alignment for molding. The core is maintained in the locked position until the molding material has been injected into the mold and the position of the core has been stabilized by hydraulic pressure. Thereafter, the cam is retracted and rotated back to the position shown in FIGS. 6 and 7, and the space between the cam member and core is filled out with the molding material.

The height of the cam head 38 is preferably equal to, or shorter than the depth of its associated recess 42. If they are equal, the locking member is extended from the base and completely telescoped into the indentation, as shown at FIG. 8, prior to locking. After the molding material is injected, the locking member is retracted into the base to fill out the bottom of the mold. If the cam is shorter than the depth of the indentation, the cam need not be extended and retracted during molding. The bottom of the mold may then be filled out by simply rotating the cam out of locking engagement. However, the witness marks left in the associated mold wall would protrude further into the container cavity than those left by a shorter, retractable cam.

In the several Figures, the protruding locking cam heads 38 are shown at the ends 40 of the cylinder shafts 34 while the complementary recesses 42 are in the free ends 26 of the cantilevered cores 22. In the alternative, the recesses could be located on the cam shaft heads and the protruding cam members on the core ends. The witness marks would then take the form of oval feet which would extend outwardly from the bottom wall of the container. Herein, the combination of a protruding cam and a complementary recess wherein either element may be rotated with respect to the other to straighten and lock a cantilevered mold core by a camming action may be referred to as a "cam-type" core locking means. The shapes of the cams and recesses is not critical. The machine element that is slidably and rotatably retained in a mold wall may be referred to as the "cam locking means" and the cooperative element in the free end of the core the "cam reacting means".

Generally, the cam and cam reacting means should be noncircular so that rotation of the cam locking member provides adequate engagement with the associated cam reacting means to provide the desired core locking and straightening. There should be clearance between a cam and a recess in the unlocked position but biasing engagement therebetween in the core-locked position.

Figure 4:
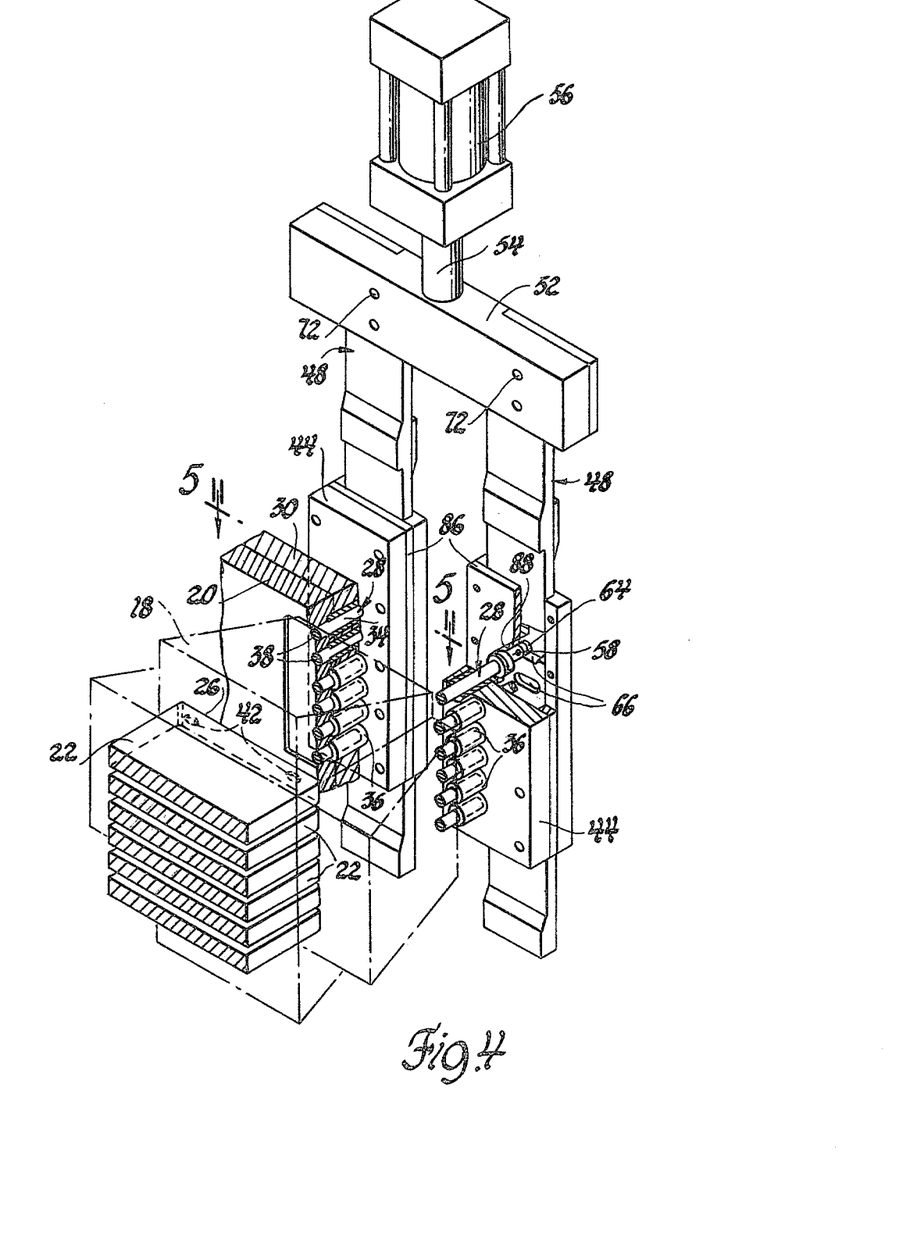
FIG. 4 is an exploded and partially sectioned view of a core locking device for making a six-celled battery case.

FIG. 4 is an exploded floating view of my preferred core locking apparatus in the molding press of FIG. 3. Some of the individual machine elements are not shown for ease of viewing. There are two banks of core locking members 28 which extend through a stock plate 44, driver bushings 36, and the mold base 20. Because the cores 22 are relatively long, it is preferred to cam them at two locations along their free ends 26 and that is the reason two banks of core locking members are used. Because they are engaged by a locking member in two places, even a very badly misaligned or bent core can be forced into the desired molding position by the operation of the subject invention. Referring to FIGS. 3 and 4, the actuating mechanism for the cam members 28 is retained in vertical orientation in the stationary side of the horizontally actuated molding press between ramp plates 46 and the stationary die 30. A slider bar 48 for each bank reciprocates in channel 50 to rotate and telescope the cams into and out of locking engagment with the cores. The slider bars 48 of the two cam banks are of like construction and are joined together by yoke 52 to operate in tandem. The yoke 52 is attached to a driver rod 54 actuated by hydraulic means 56. The reciprocation of the slider bars 48 in the channels 50 is synchronized with the molding cycle.

Each individual cam member 28 is coupled to a slider bar 48 by means of a crank arm 58. As seen in FIG. 5, the foot 60 of the cam shaft 34 is anchored into one end of the crank arm 58 by means of a hex-fit coupling 62. A crank pin 64 connected at the other end and opposite side of the crank arm is actuated by the motions of the slider bar 48 and moves in a slot 66 therein. A thrust washer 68 is located between the stock plate 44 and cam shaft foot 60. Space 70 between the stock plate 44 and bushing 36 allows horizontal reciprocating movement of the cam shaft 34 in the bushing 36, telescoping the cam head 38 into and out of the corresponding recess 42 in the core 22. Rotational movement is provided to the cam member 28 by the movement of the crank arm 58. As the slider bar 48 reciprocates in the vertical direction in the mold channel 50, the crank pin 64 slides in the slot 66.

Figure 10A:
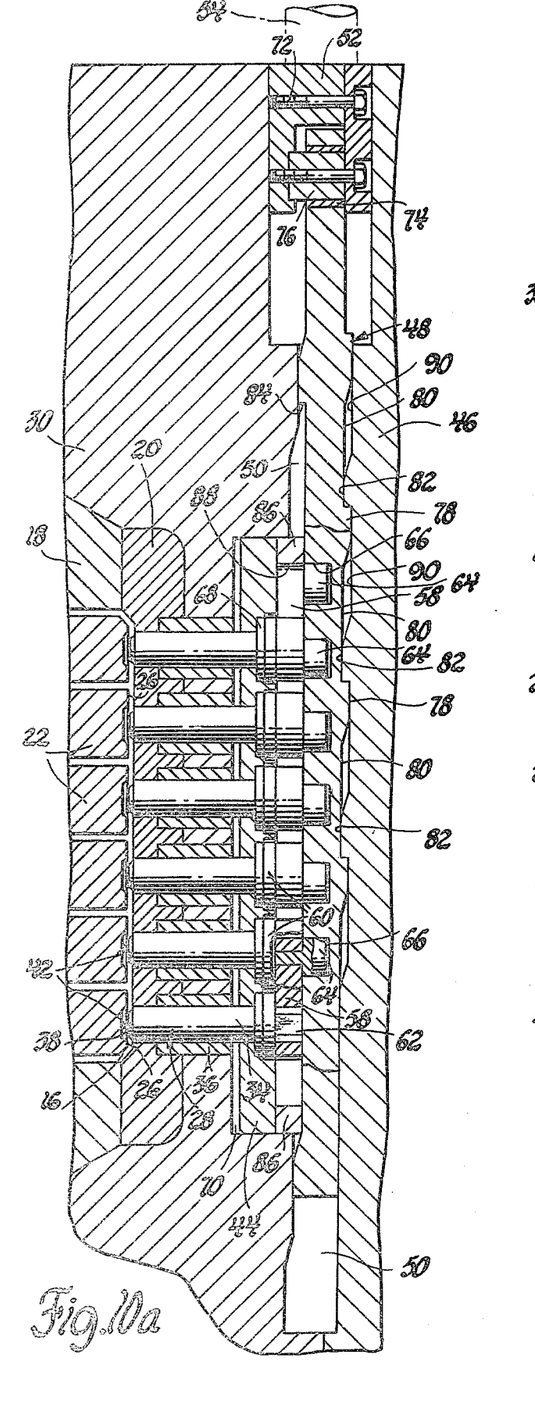
FIGS. 10(a) through 10(d) show sectional views of a preferred core locking mechanism at various points of the molding cycle.
Figure 10B:
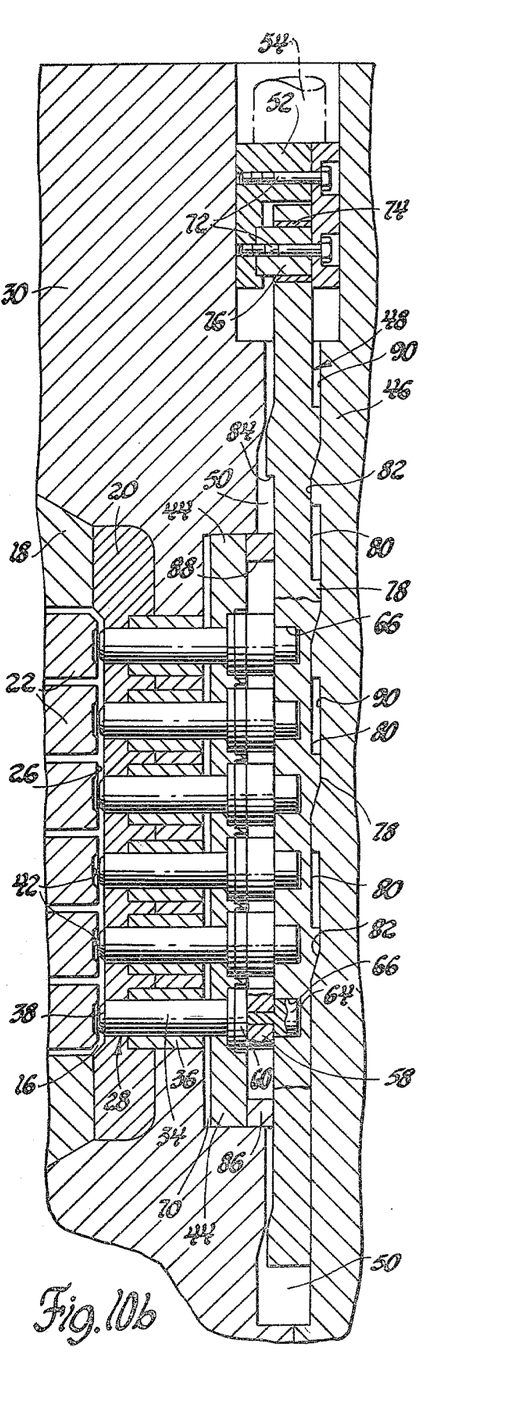
Figure 10C:
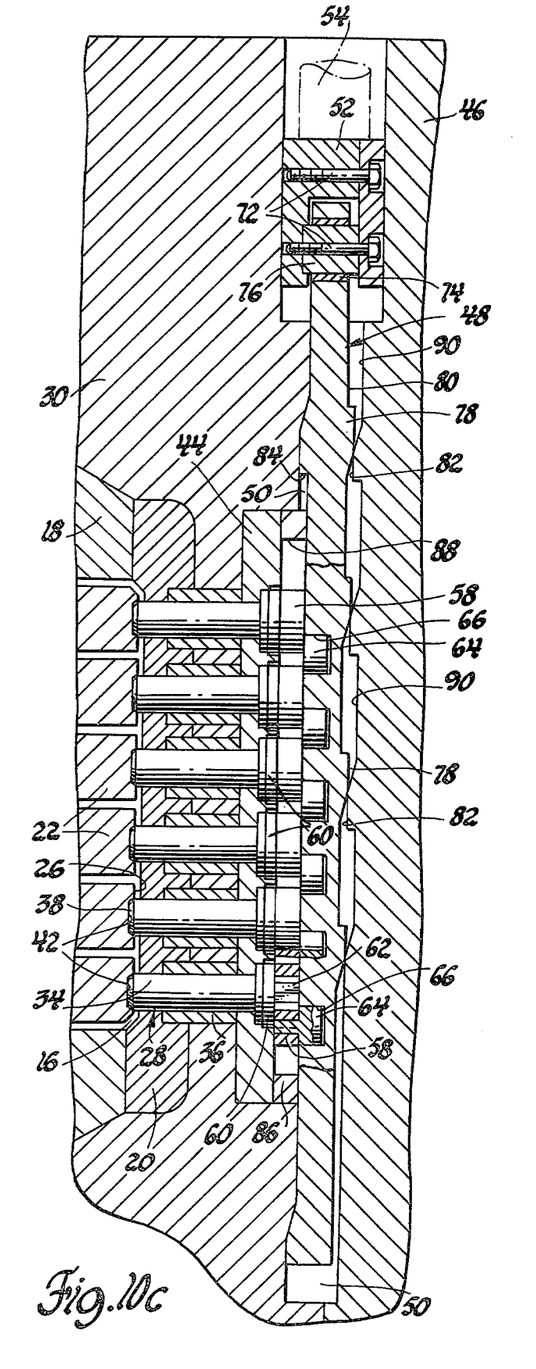
Figure 10D:
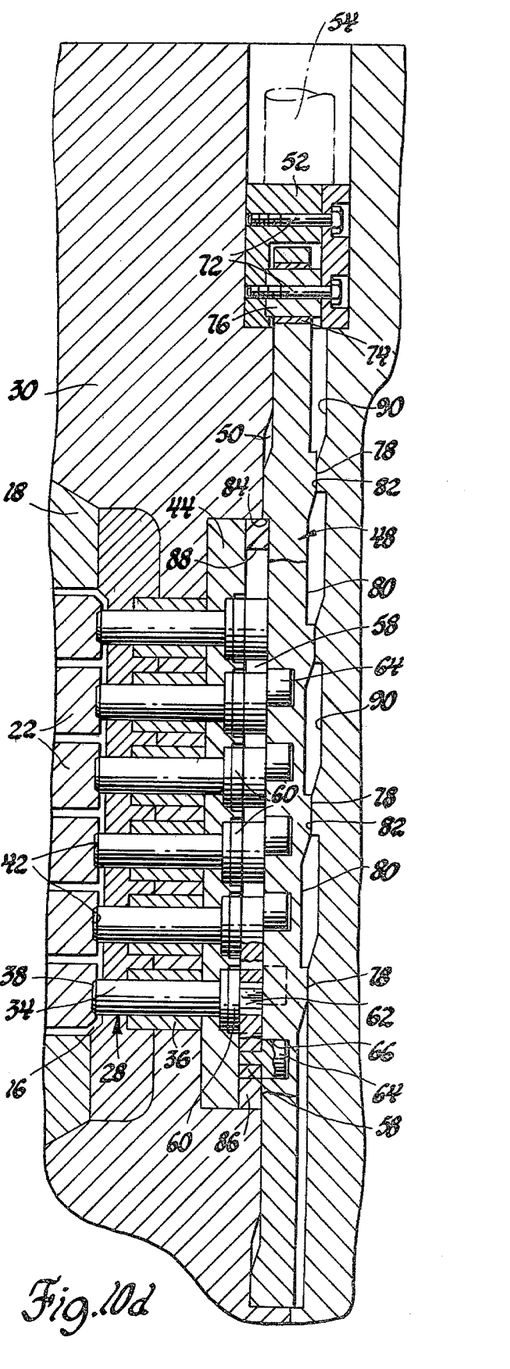
Figure 11A:
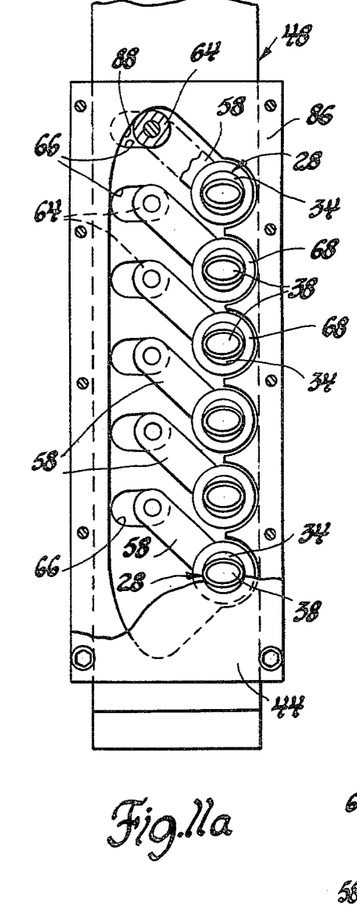
FIGS. 11(a), (b) and (c) show views partly broken away of a mechanism for actuating a bank of core locking cams in the cam unlocked partially rotated and cam locked positions, respectively.
Figure 11B:
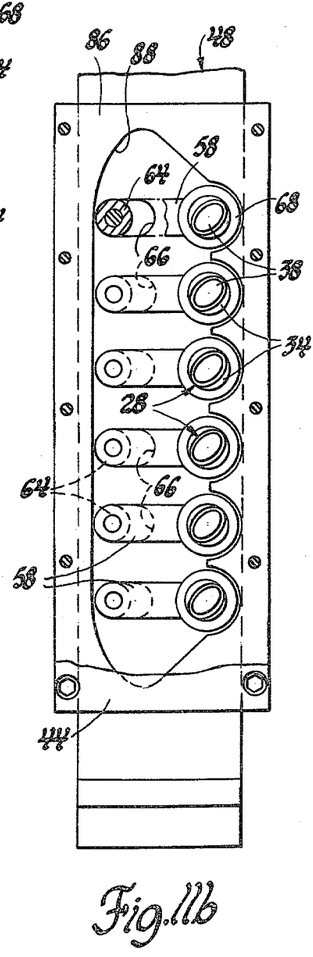
Figure 11C:
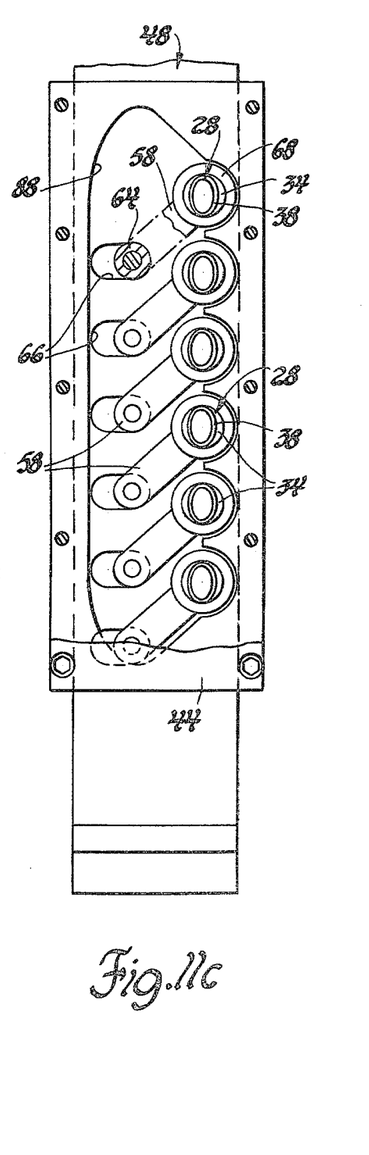

Operation of the apparatus to accomplish the subject core locking method will be better understood in view of FIGS. 10(a)–(d) and corresponding FIGS. 11(a)–(c).

FIG. 10(a) shows a bank of cam locking members 28 immediately after mold closure. The lowermost cam member is depicted partly in section to show the position of crank arm 58. The slider bar 48 is mounted to the yoke 52 by bolts 72. The bar 48 reciprocates horizontally on a bushing 74 which is journaled about spacer 76. The slider bar 48 is provided with a series of tapered feet 78 which project from the base surface 80 of the slider 48 adjacent ramp plate 46. Cooperative inclined ramp surfaces 82 are provided on the stationary ramp plate 46. The vertical reciprocation of the slider bar 48 in the channel 50 causes the tapered feet 78 surfaces to ride up on the inclined ramp surfaces 82 so that the slider bar is incremented towards the cores 22 in a horizontal direction. FIG. 10(a) shows the slider bar 48 in the fully upwards position. The square ends of the slider bar feet 78 and the ramp surfaces 82 are engaged so that any further upwards motion of the slider is prevented. The step shoulder 84, on the opposite side of the slider bar 48, and spacer plate 86 operate to arrest the slider bar at the lower extent of its travel as shown at FIG. 10(d).

Vertical reciprocation of slider bar 48 in channel 50 provides for the coordinated telescoping of cam heads 38 into corresponding core recesses 42 and the rotation of the telescoped cam heads with respect to recesses 42 to lock cores 22 into alignment for molding.

FIGS. 10(a) and 11(a) show a slider bar 48 in the fully upward position. Slider bar 48 has an elongated slot 66, rounded at either end, for each cam member 28. The cylindrical crank pin 64, which is affixed to the free end of each crank arm 58, is carried in a slot 66. As the slider bar reciprocates, the crank pins trace arcs about the center of cam shafts 34. Spacer plate 86 is cut out as indicated by 88 on FIG. 11 to accommodate the travel of the crank arms 58. As the pins 64 are carried by the slider bar 48, the cam members at the fulcrum ends of crank arms 58 are rotated. The cam heads 38 are oriented on the shaft heads 40 so that in the slider fully-up position, the major axes of the cam heads and recesses are parallel. The cut out in spacer plate 86 is made to accommodate 90 degrees of radial travel for crank arm 58 which produces 90 degrees of cam head 38 rotation relative to the stationary recesses 42. FIGS. 10(*d*) and 11(*c*) show the slider bar in the fully-down position wherein the crank arm has moved through the full 90° of arc and the cam head has rotated 90° with respect to FIGS. 10(*a*) and 11(*a*).

Referring again to FIG. 10(*a*), it can be seen that in the fully-up position, the slider bar feet 78 are nested in the base surface portions 90 of ramp plate 46. Thus the cam heads 38 are fully retracted with respect to mold base 20. This is the position for mold closure so that there is no contact between the cam members 28 and the cores. Consequently no damage would result, even to a severely bent core, upon mold closure.

After the mold is closed, the slider bars 48 are pushed downward by the hydraulic piston 56. FIG. 10(*b*) corresponds to FIG. 11(*b*) and shows the slider bar in the partially down position whereat the crank pins 64 and cam members 28 lie in the same horizontal plane. The crank arms 58 and cam heads 38 have rotated 45° from the fully-up position of FIGS. 10(*a*) and 11(*a*).

FIG. 10(*c*) shows the slider bar after it has been incremented farther down from the position of 10(*b*) so that the inclined feet 78 of slider bar 48 have ridden up on the inclined ramp surfaces 82 of ramp plate 46. This causes lateral movement of the slider bar on spacer 76 to telescope the cam heads 38 into core recesses 42.

FIG. 11(*c*) corresponds to FIG. 10(*d*), both showing slider bar 48 after it has been stroked to the fully downward position. Crank pins 64 have now carried the free ends of crank arms 58 to their lowermost position in the cutout portion of spacer plate 86. The cams are still telescoped in the recesses and have been rotated 90° from the slider bar fully-up position. The major axes of the cams lie parallel to the minor axes of the recesses. These axes are of equal length so that the core ends 26 are positively engaged and locked into straightened and parallel positions for molding.

At this point in the molding cycle, fluidic molding material is injected into the mold under pressure. Fill-out of the cavity with the material hydraulically fixes the position of the cores. The slider bar is then withdrawn to the fully-up position of FIG. 10(*a*) and additional material is injected under pressure. It flows between the cores and cams to complete the container bottom. After material injection is stopped and the molding material has hardened, the battery case is ejected from the mold. The cycle may be repeated as desired.

While my invention has been described in terms of a specific embodiment thereof, other forms may be readily adapted by one skilled in the art. Therefore, my invention is limited only by the following claims.

The embodiments of the invention in which an exclusive property or privilege is claimed are defined as follows:

1. Means for straightening and locking a cantilevered core in desired alignment with a mold in an injection molding apparatus, comprising:
   a core locking cam means rotatably retained in a wall of the mold opposite the free end of the core;
   a complementary cam reacting means for said locking cam means, said complementary means being located in the free end of the core;
   means to rotate said core locking cam means with respect to said complementary reacting means from an unlocked position into locking engagement such that in said locking engagement the core is forced into desired alignment before injecting a molding material.

2. Means for straightening and locking a cantilevered core in desired alignment with a mold in an injection molding apparatus comprising:
   a core locking cam means rotatably and reciprocatively retained in a mold wall opposite the free end of the core;
   a complementary cam reacting means for said locking cam means, said complementary means being located in the free end of the core;
   means to reciprocate said core locking means between retracted and telescoped positions with respect to said cam reacting means; and
   means to rotate said core locking cam means with respect to said complementary means from an unlocked to a locked position such that in the cam means telescoped and locked position the core is forced into desired alignment prior to injecting a molding material and such that in the cam means retracted and unlocked position a molding cavity is formed between the core and mold wall.

3. A mold for injection molding a deep, thin-walled container, the molding cavity therefore being defined between a mold and at least one cantilevered core comprising:
   a mold wall defining a face of said container having at least one locking cam member for each said core rotatably retained therein;
   a complementary cam reacting member for each said locking cam member located in the free end of a said core and sized relative to the locking cam member such that in the unlocked position, there is sufficient clearance therebetween to form a cavity for a container wall,
   means to rotate said locking cam member with respect to said complementary cam reacting member such that a said core end is engaged and locked into desired molding alignment prior to injecting the molding material and such that the cam member may be rotated to the core unlocked position after the molding material is injected.

4. A mold for injection molding a deep, thin-walled container wherein means are provided to straighten and lock a cantilevered core within the mold cavity prior to injecting a molding material therein, comprising:
   a mold base member opposite the free end of said core having at least one locking cam member rotatably and reciprocatively retained therein;
   a complementary cam reacting member for each said locking cam member located in the free end of the core;
   means to reciprocate said locking cam member between a retracted position and a telescope position with respect to said complementary cam reacting member;
   means to rotate said locking cam member with respect to said cam reacting member from a first locked position whereat the cam member is telescoped to a second unlocked position whereat the cam member is retracted, wherein said first locked and telescoped position the core end is cammed into desired molding alignment by the locking cam member and wherein said second unlocked and retracted position the space between the mold base and core defines a molding cavity for a container wall.

5. A mold for injection molding a thin-walled container divided into compartments by integral thin partitions comprising:

means defining the mold cavity for said container including a platen carrying at least two mold cores having spaced apart faces defining a said thin partition therebetween, said cores being cantilevered from the platen member and each having an unsupported end face with at least one ellipsoidal indentation therein;

a mold base adjacent the core ends which in molding position defines a container wall therebetween, said base carrying retractable and rotatable ellipsoidal cams lockingly engageable with said core indentations, said cams being sized such that the lengths of their major axes are substantially equal to the lengths of the minor axes of their respective indentations;

means operative after the mold is closed to rotate the cams relative to the indentations such that the major axes of the cams are parallel to the minor axes of the indentations thereby locking the cores into molding alignment, said means being operative after the molding material is injected to rotate the cams out of the locking position to permit fill-out of the said container wall.

6. A mold for injection molding a thin-walled partitioned container, comprising:

means defining the mold cavity for said container comprising a platen member carrying at least two core members cantilever supported from said platen member, said core members having spaced faces defining thin partitions for said container therebetween and each core member having an end face with an ellipsoidal first camming member;

said cavity means further having a base plate member cooperative with said core members in molding position to define the bottom of the container, said base plate having ellipsoidal complementary camming members which are movable between inserted and retracted positions with respect to said first camming members, the major axes dimensions of said complementary camming members being substantially equal to the corresponding minor axes dimensions of the first camming members;

operating means effective when the mold is being closed to rotate the complementary camming members such that the major axes of said first and complementary camming members are parallel and after mold closure to insert the complementary camming members in said first cam members and to rotate them approximately 90° thereby positively supporting the ends of the core members and camming them into desired alignment, and means effective after the mold material is injected and the position of the cores is thereby hydraulically fixed to rotate the complementary camming members back to said parallel alignment with respect to said first camming members and to retract them from said inserted position to fill out the bottom of the container with said mold material.

7. A mold for injection molding a thin-walled, partitioned container comprising:

side and bottom die members movable between mold open and closed positions defining the sides and bottom of a said case;

a plurality of cantilevered core members insertable within said die members which in the mold closed position cooperate therewith to define the molding cavity, the spaces between adjacent core members defining partition walls and each core member having at least one noncircular recess in its free end;

a noncircular core locking cam for each said core recess cams which are slidably and rotatably retained in the said bottom die member, each said cam being sized and shaped to telescope into and clear the corresponding core recess when said mold is closed and being adapted to thereafter rotate into core locking engagement with said recess;

a cam plate underlying said core locking cams which is slidable on a ramp plate to alternately slide said cams and recesses into and out of telescoping engagement, the direction of cam plate movement being perpendicular to the rotational axes of the core locking cams, the movement of said cam plate means being coordinated with the rotation of the core locking cams to bring the cores into desired alignment before the molding material is injected into the mold cavity and to thereafter unlock and move cams out of telescoping engagement so that said injected material fills out the container.

8. Means for straightening and locking a cantilevered mold core for an injection molded, deep, thin-walled container, comprising:

a least one locking cam member that is slidably and rotatably retained in the base of the mold opposite the free end of the core;

a complementary cam member for said locking member in the free end of said core;

a cam plate beneath said locking cam member having a cammed sliding surface, said plate being reciprocable in a direction perpendicular to the rotational axis of said locking cam member;

a ramp plate adjacent said cam plate having ramp surfaces on which said cammed sliding surface rides as the cam plate reciprocates, said riding alternately bringing said locking cam member into and out of telescoping relation with said complementary cam member;

and translation means between said locking cam member and cam plate operative to translate the reciprocative motion of the cam plate into rotational motion of the locking member, said translation means being operative to coordinate said reciprocative and rotational motions so that the locking member is telescoped into the complementary member and rotated to the core locked position before molding material is injected into the mold and out of telescoping engagement and rotated to the core unlocked position thereafter so that the end face of the container is filled-out with the molding material.

9. A mold for injection molding a deep, thin-walled container, the molding cavity therefore being formed between the side walls of a mold and at least one elongated, cantilevered core member wherein a said core member is locked into position for molding by engaging a locking means comprising a locking cam member slidably and rotatably retained in the mold base and a corresponding complementary cam member in the free end of the core by rotating said locking cam member relative to said complementary member, wherein said locking means further comprises:

- a slider bar located beneath said locking cam member, said bar having a cammed sliding surface and being reciprocable in a direction perpendicular to the rotational axis of said locking member;
- a stationary ramp plate adjacent said slider bar having a ramp surface on which the cammed sliding surface rides, the relative sliding motion of said ramp and reciprocated slider bar cooperative to move said locking cam members into and out of telescoping engagement with said complementary cam members; and
- translation means between said locking cam member and slider bar operative to translate the reciprocative motion of the slider bar into rotational motion of the locking member about its rotational axis, said translation means being operative to coordinate said reciprocative and rotational motions so that the locking member is telescoped into the receiving member and rotated to the core locked position before molding material is injected into the mold and thereafter moved out of telescoping engagement and rotated to the core unlocked position so that the end face of the container is filled out with the molding material.

10. Means for straightening and locking an elongated cantilevered mold core into the desired position for injection molding a deep, thin-walled container, comprising:

an ellipsoidal locking cam slidably and rotatably retained in the mold base opposite the free end of said cantilevered core;

an ellipsoidal cam receiving recess for said locking cam located in the free end of the core, said receiving member being sized and shaped such that the locking cam may be rotated therein to alternately lock and unlock the core;

a slider bar retained in a mold channel at the base of the locking cam, said bar having a contoured sliding surface that cooperates with a ramp surface in the channel to reciprocate said driver means in the mold base such that the locking cam moves into and out of telescoping engagement with the cam receiving member;

a crank arm having one end pivotally mounted in said slider bar and the other end secured to the base of said locking cam, the crank arm translating the motion of the slider bar in the channel so that the locking cam is telescoped into the cam receiving member and rotated into the locked position prior to injection of the molding material and thereafter unlocked to allow fill out of the bottom of the mold.

* * * * *